United States Patent [19]

Hansen, Jr. et al.

[11] 4,223,263
[45] Sep. 16, 1980

[54] COMBINATION EXCITER/PERMANENT MAGNET GENERATOR FOR BRUSHLESS GENERATOR SYSTEM

[75] Inventors: Charles M. Hansen, Jr., Ocean City; Alfred W. Wohlberg, Neptune, both of N.J.

[73] Assignee: The Bendix Corporation, Eatontown, N.J.

[21] Appl. No.: 939,149

[22] Filed: Sep. 1, 1978

[51] Int. Cl.³ .............................................. H02P 9/30
[52] U.S. Cl. ..................................... 322/47; 310/112; 310/156; 322/87
[58] Field of Search ....................... 322/46, 47, 60, 63, 322/86–88; 310/152, 156, 112

[56] References Cited

U.S. PATENT DOCUMENTS

| | | | |
|---|---|---|---|
| 2,540,202 | 2/1951 | Haas | 322/46 X |
| 3,683,268 | 8/1972 | Obata | 322/28 X |
| 3,758,843 | 9/1973 | Ishizaki et al. | 322/28 X |
| 4,015,189 | 3/1977 | Gorden | 322/46 |

Primary Examiner—Robert J. Hickey
Attorney, Agent, or Firm—Anthony F. Cuoco; William F. Thornton

[57] ABSTRACT

A combination exciter/permanent magnet generator for a brushless generator system features a permanent magnet generator wound directly on the exciter structure, while allowing the permanent magnet generator and exciter to be functionally independent of each other. The arrangement is such that the permanent magnet generator provides sufficient voltage under a wide range of speed, load and temperature conditions to turn on power transistors included in a voltage regulator associated with the generator system and to insure adequate system self build-up to a required output voltage without increasing the size of the system as would otherwise be the case.

9 Claims, 4 Drawing Figures

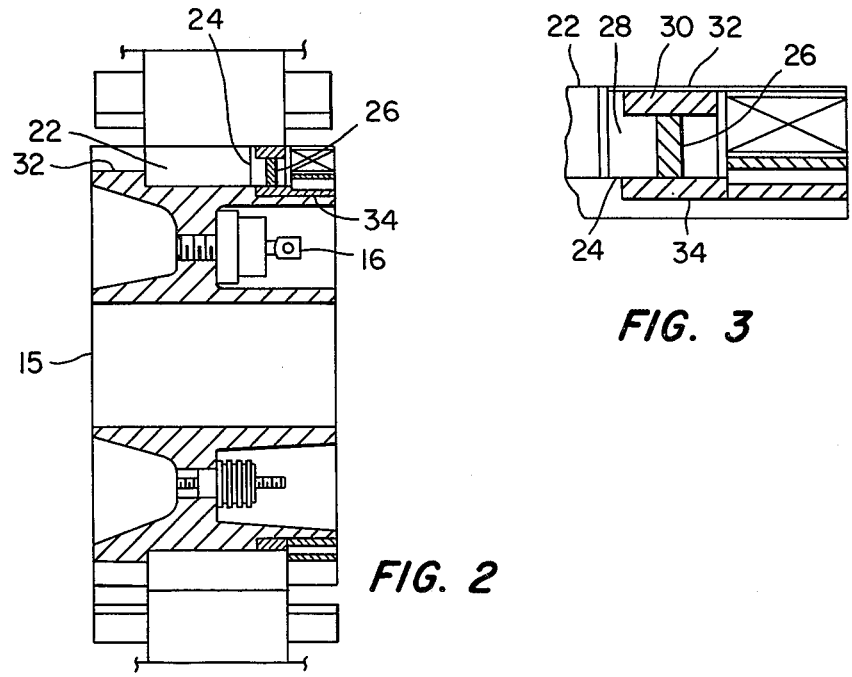
FIG. 2
FIG. 3
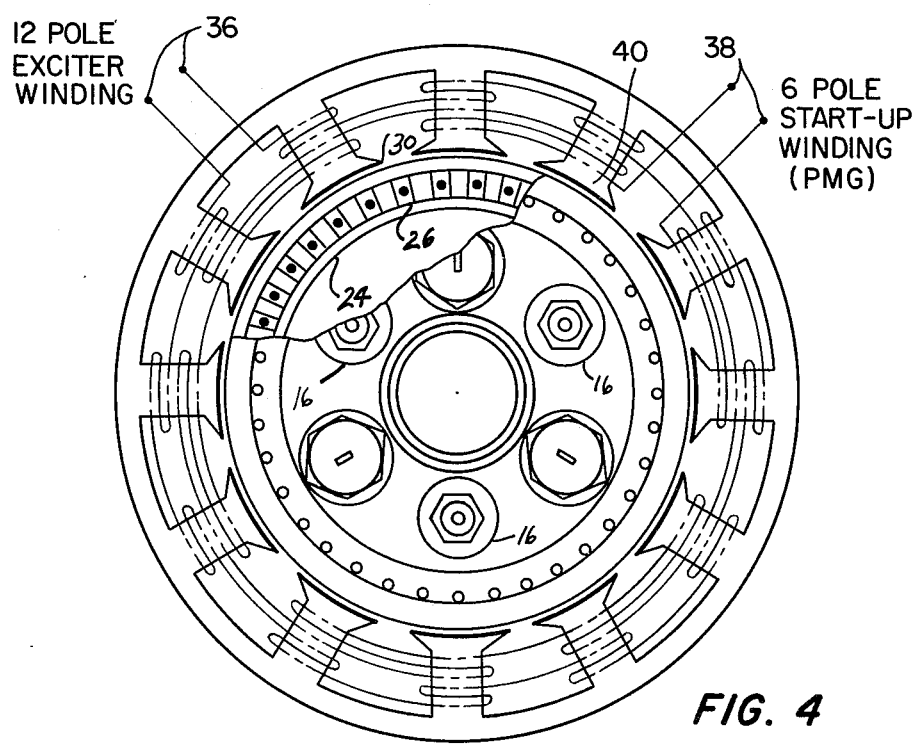
FIG. 4

COMBINATION EXCITER/PERMANENT MAGNET GENERATOR FOR BRUSHLESS GENERATOR SYSTEM

FIELD OF THE INVENTION

This invention relates generally to brushless generator systems and more particularly to a brushless generator system combining a permanent magnet separator with the system exciter, with the permanent magnet generator and exciter functioning independently of each other to provide output voltage self build-up characteristics without increasing the size of the machine.

DESCRIPTION OF THE PRIOR ART

Generator systems such as used in turbo jet engine applications, for example, require output voltage self build-up characteristics. Generator systems for the purposes described may be of a conventional brush type or may be brushless machines. Brush type DC machines do not use output rectifiers to obtain DC voltage since commutator action provides this function. As a result, there is always sufficient residual voltage to forward bias power transistors used in voltage regulators associated with the machines and thus achieve the required self build-up, since no voltage is lost in rectifier junction drops.

Brushless machines may use, for example, properly annealed vanadium permendur laminations for providing sufficient residual voltage to overcome the aforenoted junction drops due to the fact that the vanadium permendur has a higher coercive force and higher residual flux density than the otherwise used silicon iron.

It is also common to accomplish the self build-up characteristics by providing a separate permanent magnet generator (PMG) with its own laminations and windings to provide high voltage for self build-up. The disadvantage of this type of implementation is that it significantly increases the length of the generator and accordingly adds to the weight and overhung moment on the drive pad. In this connection, it is noted that permanent magnet generators can be of either the rotating magnet or rotating reluctor configuration.

The arrangement to be herein described uses a permanent magnet generator arrangement and provides sufficient residual voltage to insure output voltage self build-up without significantly increasing the weight and overall length of the machine. In addition, the residual voltage is obtained without resorting to expensive magnetic lamination materials such as the aforenoted vanadium permendur or the like.

SUMMARY OF THE INVENTION

This invention contemplates a brushless generator system having excitation means including an exciter field, an exciter armature, a rotor, a rotating field and a main stator. The generator system output is obtained by applying a DC current to the exciter field. Upon rotation of the rotor, magnetic flux is induced in the exciter armature which creates an AC voltage in the exciter armature. The brushless feature is provided by diodes in the rotor which convert the AC armature voltage to a DC current which is impressed on the rotating field. The rotating field then produces a magnetic flux which creates an AC voltage in the main stator. A DC generator is provided by using a diode arrangement to rectify the main stator AC voltage. In order to provide self build-up, the generator system must produce sufficient residual DC voltage to initiate current flow into the exciter field, and this requires overcoming junction drops inherent in power transistors in a voltage regulator which drives the exciter field and in diodes which rectify the main stator AC.

The structural arrangement herein described combines a permanent magnet generator with the exciter armature such that a non-interactive start-up winding is disposed on the exciter field windings. Hence, two separate windings are placed on a common core without one winding significantly affecting the other so as to provide sufficient residual voltage to insure output voltage self build-up without increasing the weight of the machine or its overall length.

DESCRIPTION OF THE DRAWINGS

FIG. 2 is a frangmental view showing the specific structural relationship of the elements included in the excitation system according to the invention.

FIG. 3 is an enlarged fragmental view better showing the structural relationship of certain of the elements included in the excitation system and shown in FIG. 2.

FIG. 4 is an end view relative to FIG. 2.

DESCRIPTION OF THE INVENTION

Figure 1:
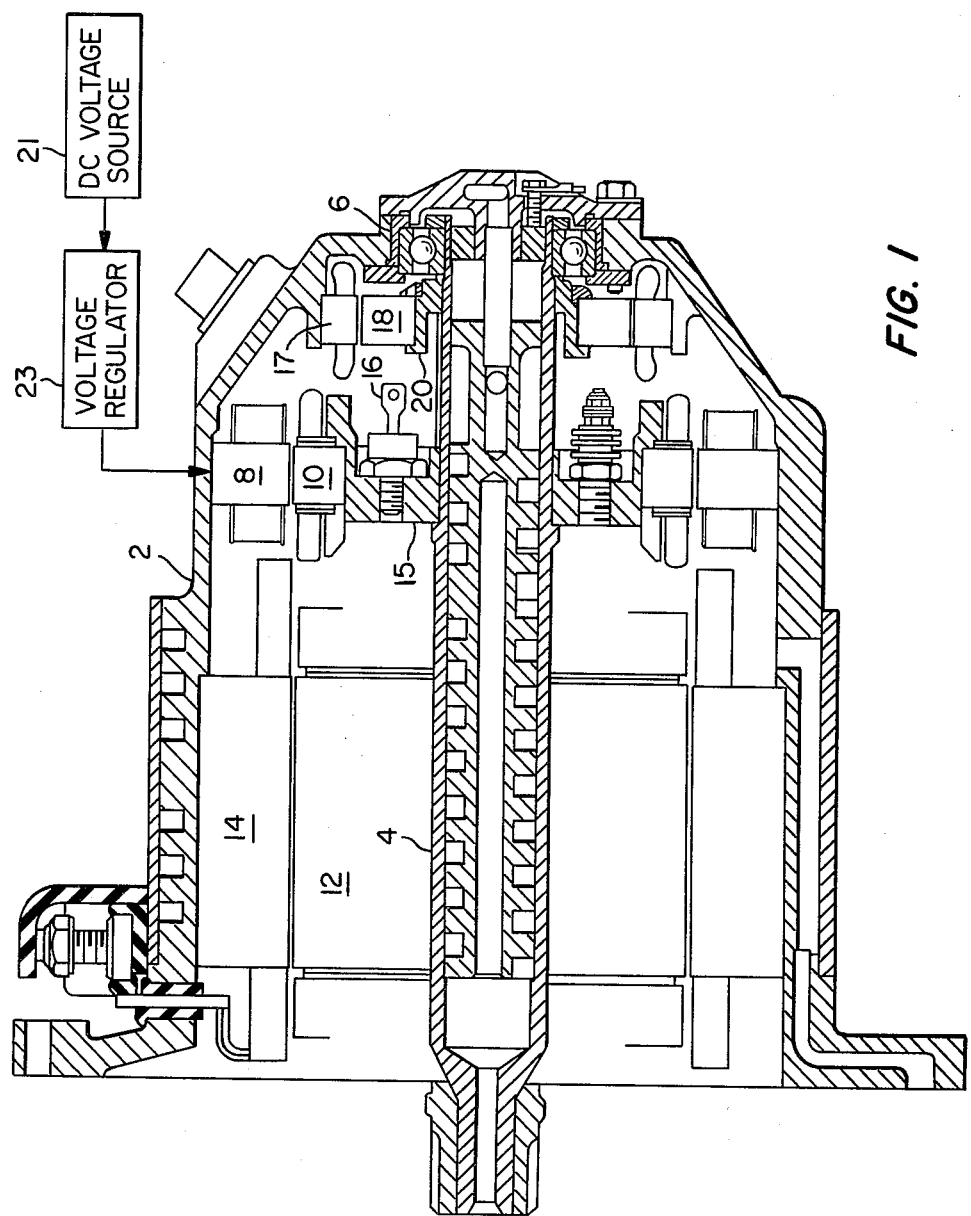
FIG. 1 is a sectioned plan view showing generally the elements of the excitation system of a brushless generator including a separate permanent magnet generator.

With reference first to FIG. 1, a brushless generator system includes a housing 2 having a shaft or rotor 4 journaled at one end thereof by a suitable bearing 6.

The excitation system of the generator includes an exciter field 8, an exciter armature 10, a rotating field 12 and a main stator 14.

Main stator 14 and exciter field 8 are suitably secured, such as by press fit or the like, within housing 2. Rotating field 12 is suitably secured, such as by press fit or the like, to shaft 4. Exciter armature 10 is secured to shaft 4 through a support member 15 which carries the armature and a plurality of rectifying diodes 16 as will hereinafter be more thoroughly explained with reference to FIGS. 2 and 4.

A permanent magnet generator (PMG) stator 17 is suitably secured, such as by press fit or the like, within housing 2 and magnetically coupled to PMG magnet 18 secured to shaft 4 through a cup member 20 or the like which carries the magnet.

The generator system output is provided by applying a DC voltage from a suitable voltage source 21 through a voltage regulator 23 to exciter field 8 as is well known in the art. In this connection, it is noted that voltage regulator 23 may be of the conventional type using silicon power transistors.

When shaft 4 is rotated by an external source, such as a prime mover or the like (not shown), magnetic flux is induced in exciter armature 10 which creates an AC voltage in the armature. The AC voltage is rectified by diodes 16 and the resulting DC is impressed on rotating field 12. The rotating field provides a magnetic flux which creates an AC voltage in main stator 14. The main stator AC is either utilized as is, or rectified by a diode arrangement or the like to provide a brushless DC machine.

It will be understood that only as much of the conventional brushless generator system and its excitation arrangement has been illustrated and described as is necessary for explaining the purposes of the invention.

It will be further understood that other like generator configurations may be used as well with the invention described, as will hereinafter become evident.

In order to provide sufficient self-build up as is required for the purposes aforenoted, the generator system must produce sufficient residual DC voltage to initiate current flow into exciter field 8. This requires overcoming the junction drops inherent in the power transistors in the voltage regulator driving the exciter field and in diodes provided for rectifying the main stator AC.

The device of the invention to be hereinafter described with reference to FIGS. 2, 3 and 4 provides means for combining a permanent magnet generator (PMG) arrangement with exciter armature 10 resulting in a non-interactive PMG winding placed on the exciter field windings. Specifically, two separate windings are disposed on a common core, without one winding significantly affecting the other as will hereafter become evident.

With reference to FIG. 2, exciter armature support 15 which rotates with shaft 4 (not shown in FIG. 2) carries exciter armature laminations 22 and rotating (diodes) rectifiers 16, shown as three in number in FIG. 4. A non-magnetic disc 24 may be disposed behind, in front of or between laminations 22. In the embodiment of the invention shown in FIGS. 2, 3 and 4 disc 24, which may be of stainless steel, Inconel, aluminum or the like, is shown as disposed behind (away from the drive end) the armature laminations.

As best shown in FIG. 3, disc 24 is drilled radially to accept a plurality of permanent magnets 26. The permanent magnets may be rods fabricated from pressed, sintered samarium cobalt. However, it is to be noted that the type of material and the configuration of the permanent magnets may vary from that described. Samarium cobalt was chosen because the energy product per unit mass is higher than any other commonly known magnetic material.

Magnets 26 are placed longitudinally in disc 24 so as to be in spaced relation with armature laminations 22 to prevent "short-circuiting" of the created magnet flux. The spaced relationship between laminations 22 and magnets 26 is best shown in FIG. 3 wherein the noted space is designated by the numeral 28.

The magnets are configured so that the number of permanent magnet poles created are half the number of exciter field poles. The total number of field poles must be divisable by four. This configuration is best illustrated in FIG. 4. Laminated iron or steel pole shoe horns 30 cover the outer diameter of each group of magnets aligned in the same direction to provide a uniform magnetic field and to prevent high frequency ripple from being induced into exciter field 8. The pole shoe horns are suitably notched as are exciter laminations 22 to prevent magnetically short-circuiting of the exciter armature winding.

The outer diameter of disc 24 is surrounded by a non-magnetic restraining band 32 such as, but not limited to Inconel or stainless steel to structurally contain the pole shoe horns 30, magnets 26, and the exciter armature windings, and to provide tension against the centrifugal forces caused by rotation. An iron or steel ring 34 is placed radially on the inside of disc 24 to complete the permanent magnet circuit. The structural relationship of exciter armature laminations 22, permanent magnet pole shoe horns 30, magnets 26, disc 24, space 28, and ring 34 is best shown in FIG. 3.

The exciter field (stator) is configured as a conventional generator system. The exciter field winding is wound in alternate directions around each of a plurality of exciter field poles 40 resulting in the case described, in a twelve-pole configuration 36, as shown in FIG. 4. The start up permanent magnet generator (PMG) winding 38, also shown in FIG. 4, is wound in alternate directions around pairs of exciter field poles, resulting in a six-pole start-up configuration which coincides with a six-pole permanent magnet configuration of the exciter armature as provided by the arrangement of permanent magnets 26 and pole shoe horns 30.

OPERATION OF THE INVENTION

Prior to build-up, when shaft 4 is rotating, the permanent magnet poles of the exciter armature induce an AC flux into the PMG start-up winding. This creates an AC voltage having a magnitude dependent on the number of turns on the pole pairs. Thic AC voltage is rectified by external rectifiers (not shown) to produce the necessary DC voltage to allow self build-up as required. No voltage is induced into the twelve pole exciter winding since the permanent magnet poles cover two exciter poles simultaneously, and the resultant currents are opposite and therefore cancelled.

Once the generator system is operating normally, exciter field winding 8 is energized by its associated voltage regulator and produces the flux necessary to provide the desired output voltage. The magnetic field produced by the exciter current is much stronger than the PMG magnetic field, but because the start-up winding is wound on alternate pole pairs rather than on alternate poles, no voltage is induced into the start-up windings due to current cancellation. It would appear that the strong exciter field flux would eventually cause demagnetization of the permanent magnets in the exciter armature, but the high coercive force of the samarium cobalt magnets prevents such demagnetization.

It will be seen from the foregoing description of the invention with reference to the drawings that means have been provided for combining a permanent magnet generator (PMG) with the exciter armature of a conventional generator system resulting in a non-interactive permanent magnet generator winding placed on the exciter field windings. Thus, two separate windings are placed in a common core without one winding significantly affecting the other. The arrangement described provides sufficient voltage under all speed, load and temperature conditions to insure output voltage self-build up of the generating system without increasing the overall size of the machine. It is noted that the structural relationship involved is not related to the generator system output and hence the invention is equally applicable to any brushless AC or DC generator system.

What is claimed is:

1. A generator system having self build-up characteristics, comprising:
    a housing;
    a rotating member journaled in the housing;
    a main stator and an exciter field secured within the housing;
    a rotating field magnetically coupled to the main stator and secured to the rotating member so as to rotate therewith;
    an exciter armature magnetically coupled to the exciter field and secured to the rotating member so as to rotate therewith, and including a lamination assembly, a non-magnetic disc arranged with the lamination assembly, a plurality of permanent magnets carried by the disc and interacting with the exciter field for providing a magnetic circuit and a magnetic ring arranged with the disc for completing the magnetic circuit;

the plurality of permanent magnets disposed radially around the disc with the disc arranged behind the lamination assembly, the magnets being in spaced relation with the disc to prevent shorting of the magnetic circuit, the number of permanent magnet poles being half the number of exciter field poles and the number of field poles being divisible by four;

the permanent magnets arranged in groups aligned in alternate directions and a plurality of pole shoe horns disposed over each group of magnets aligned in the same direction to provide a uniform magnetic field and to prevent high frequency ripple from being induced in the exciter field;

means for energizing the exciter field so that a voltage is created in the exciter armature upon rotation of the rotating member;

the rotating field being responsive to the voltage created in the exciter armature for creating a voltage in the main stator;

a plurality of exciter field poles;

the exciter field including a winding wound in alternate directions around the field poles;

a permanent magnet generator including a stator having a winding wound in alternate directions around pairs of the exciter field poles; and the permanent magnet generator stator winding providing a start-up winding which is non-interactive with the exciter field winding, whereby a residual voltage is developed for self build-up of the generator system output voltage.

2. A generator system having self build-up characteristics, comprising:

a housing;

a rotating member journaled in the housing;

a main stator and an exciter field secured within the housing;

a rotating field magnetically coupled to the main stator and secured to the rotating member so as to rotate therewith;

an exciter armature magnetically coupled to the exciter field and secured to the rotating member so as to rotate therewith, and including a lamination assembly, a non-magnetic disc arranged with the lamination assembly, a plurality of permanent magnets carried by the disc, and interacting with the exciter field for providing a magnetic circuit, and a magnetic ring arranged with the disc for completing the magnetic circuit;

means for energizing the exciter field so that a voltage is created in the exciter armature upon rotation of the rotating member;

the rotating field being responsive to the voltage created in the exciter armature for creating a voltage in the main stator;

a plurality of exciter field poles;

the exciter field including a winding wound in alternate directions around the field poles;

a permanent magnet generator including a stator having a winding wound in alternate directions around pairs of the exciter field poles; and the permanent magnet generator stator winding providing a start-up winding which is non-interactive with the exciter field winding, whereby a residual voltage is developed for self build-up of the generator system output voltage.

3. A generator system as described by claim 2, wherein:

the plurality of permanent magnets is disposed radially around the disc;

the non-magnetic disc is arranged behind the lamination assembly; and the magnets disposed radially around the disc are in spaced relation with the disc to prevent shorting of the magnetic circuit.

4. A generator system as described by claim 2, wherein:

the permanent magnets are arranged so that the number of permanent maget poles is half the number of exciter field poles; and the number of field poles is divisible by four.

5. A generator system as described by claim 2, including:

the permanent magnets arranged in groups aligned in alternate directions; and a plurality of pole shoe horns disposed over each group of magnets aligned in the same direction to provide a uniform magnetic field and to prevent high frequency ripple from being induced in the exciter field.

6. A generator system as described by claim 2, including:

a magnetic ring arranged with the disc for completing the magnetic circuit.

7. A generator system having self build-up characteristics, comprising:

a housing;

a rotating member journaled in the housing;

a main stator and an exciter field secured within the housing;

a rotating field magnetically coupled to the main stator and secured to the rotating member so as to rotate therewith;

an exciter armature magnetically coupled to the exciter field and secured to the rotating member so as to rotate therewith and including a lamination assembly, a non-magnetic disc arranged with the lamination assembly, and a plurality of permanent magnets carried by the disc and interacting with the exciter field for providing a magnetic circuit;

the permanent magnets arranged in groups aligned in alternate directions and a plurality of pole shoe horns disposed over each group of magnets aligned in the same direction to provide a uniform magnetic field to prevent high frequency ripple from being induced in the exciter field;

means for energizing the exciter field so that a voltage is created in the exciter armature upon rotation of the rotating member;

the rotating field being responsive to the voltage created in the exciter armature for creating a voltage in the main stator;

a plurality of exciter field poles;

the exciter field including a winding wound in alternate directions around the field poles;

a permanent magnet generator including a stator having a winding wound in alternate directions around pairs of the exciter field poles; and the permanent magnet generator stator winding providing a start up winding which is non-interactive with the exciter field winding, whereby a residual voltage is developed for self build-up of the generator system output voltage.

8. A generator system as described by claim 7, wherein:

the plurality of permanent magnets is disposed radially around the disc;

the non-magnetic disc is arranged behind the lamination assembly; and the magnets disposed radially around the disc are in spaced relation with the disc to prevent shorting of the magnetic circuit.

9. A generator system as described by claim 7, wherein:

the permanent magnets are arranged so that the number of permanent magnet poles is half the number of exciter field poles; and the number of field poles is divisible by four.

* * * * *